/ Patented Jan. 2, 1945

2,366,328

UNITED STATES PATENT OFFICE 2,366,328

COPOLYMERIZATION OF BUTADIENE HYDROCARBONS AND ARYL OLEFINS

Charles F. Fryling, Akron, Ohio, assignor, by mesne assignments, to The B. F. Goodrich Company, Akron, Ohio, a corporation of New York No Drawing. Application December 22, 1941, Serial No. 424,012

20 Claims. (Cl. 260—86.5)

This invention relates to the copolymerization of butadiene hydrocarbons with aryl olefins, and particularly to a method whereby products having increased plasticity may be obtained.

The copolymers produced by polymerizing a mixture of a butadiene hydrocarbon and an aryl olefin in the form of an aqueous emulsion are often somewhat deficient in plasticity, and are consequently difficult to mill and to subject to other processing operations. It has been proposed to effect emulsion polymerizations in the presence of sulfur-containing compounds called "modifiers" which increase the plasticity and solubility of the products. Polymerization of a mixture of butadiene and styrene in the presence of a sulfur-containing modifier does exert a favorable effect upon the solubility of the products, but the effect is not as pronounced as in certain other systems such as the butadiene: acrylonitrile system, and the use of additional modifier does not compensate for the deficiency in activity.

I have now discovered that plastic soluble copolymers may be prepared by polymerizing a mixture comprising a butadiene hydrocarbon and an aryl olefin in the form of an aqueous emulsion in the presence of a dixanthogen and a diazoamino aryl compound. The desirable properties exhibited by the products so prepared cannot be duplicated if either the dixanthogen or the diazoamino aryl compound is absent during the polymerization, and the super-additive effect obtained by the conjoint use of the two materials is one which could not have been anticipated from a knowledge of the behavior of either dixanthogens or diazoamino aryl compounds in emulsion polymerizations.

Any desired butadiene hydrocarbon, by which I mean butadiene-1,3 and its homologues which enter into polymerization reactions in essentially the same manner such as isoprene, piperylene, or 2,3-dimethylbutadiene, may be employed in practicing the method of this invention. The second polymerizable compound employed may be any aryl olefin such as styrene (vinyl benzene), methyl styrene (ortho, meta, para, alpha, or beta), p-methoxy styrene, p-chlorostyrene, alpha-vinyl naphthalene, beta-vinyl naphthalene, etc. When less aryl olefin than butadiene is employed, the properties of the copolymer tend to be rubber-like; when greater quantities of aryl olefin are employed, the properties of the copolymer tend to be resinous. In either case, the presence of the mixture of dixanthogen and diazoamino aryl compound during the polymerization produces a beneficial effect on the properties of the products. A mixture of butadienes or aryl olefins may be employed, if desired, and other monomers such as acylonitrile or methyl isopropenyl ketone may be copolymerized with the butadiene and aryl olefin.

As dixanthogens which may be employed may be mentioned dimethyl dixanthogen, diethyl dixanthogen, diisopropyl dixanthogen, di-ter. butyl dixanthogen, di-act. amyl dixanthogen, di-2-ethylhexyl dixanthogen, ditetrahydrofurfuryl dixanthogen, dimethoxymethyl dixanthogen, etc. Any diazoamino aryl compound may be employed such as diazoaminobenzene, ortho, meta, and para diazoaminotoluenes, 4-methyldiazoaminobenzene, benzenediazoaminonaphthalene, benzeneazotetrahydronaphthylamine, or any other desired compounds such as those mentioned in my copending application Serial No. 399,940 filed June 26, 1941. The two types of modifier may be employed in any desired ratio, although somewhat better results are ordinarily obtained when the dixanthogen is present in greater amounts than the diazoamino aryl compound. The mixture of dixanthogen and diazoamino compound may be present in any desired proportion from 0.1% or even less based on the monomers to 5% or more, the higher proportions of the mixture in general producing softer, more soluble polymers.

As a specific example of one embodiment of this invention, a mixture of 75 parts by weight of butadiene and 25 parts of styrene was agitated at 40° C. in the presence of 250 parts of a 2% aqueous solution of myristic acid which had been 95% neutralized with sodium hydroxide, 0.27 parts of hydrogen peroxide, 1 part of

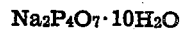

Na₂P₄O₇·10H₂O 0.00025 part of CoCl₂·2H₂O, and 0.07 part of Fe₂(SO₄)₃·6H₂O until the polymerization was finished. The synthetic rubber obtained by coagulating the resulting latex was 7% soluble in benzene. The inclusion of 0.1% of diazoaminobenzene in the emulsion during the polymerization increased the solubility of the product in benzene to 10%, while the inclusion of 0.45 part of diisopropyl dixanthogen in the emulsion during the polymerization increased the solubility of the product in benzene to 33%. The use of both 0.1 part of diazoaminobenzene and 0.45 part of diisopropyl dixanthogen, however, produced an exceptionally plastic polymer which was completely soluble in benzene and which yielded a vulcanizate exhibiting very desirable properties when it was tested in a tire-tread recipe. Furthermore, it was impossible to duplicate the desirable properties of the product by the use of either a dixanthogen or a diazoamino aryl compound alone. Any other mixture of butadiene and styrene containing from about 15 to 40% by weight of styrene may be polymerized by the above method to yield a synthetic rubber particularly suited for the manufacture of tires.

The polymerization of a butadiene and an aryl olefin in aqueous emulsion may be effected by various other per-compounds than hydrogen peroxide including per-acids and per-salts, such as peroxynitric acid, persulfates, perborates, percarbonates, etc.

The polymerization reactions may be catalyzed in any desired manner, the use of heavy metal catalysts being particularly advantageous. The heavy metal catalyst may be added to the emulsion in the form of less than 0.1% based on the weight of the monomers of a simple ionizable heavy metal salt such as cobalt chloride, nickelous sulfate, mercuric chloride, etc., as disclosed in the copending application of William D. Stewart, Serial No. 379,712 filed February 14, 1941 or in the form of a redox system comprising a heavy metal and a material such as sodium pyrophosphate, levulinic acid, glycine, cystine, beta-mercaptoethanol, quebrachitol, ox-bile, or cholesterol as disclosed in the copending applications of William D. Stewart, Serial Nos. 379,713 to 379,717 filed February 14, 1941. Mixtures of heavy metal catalysts may also be employed as disclosed in the copending application of William D. Stewart and Benjamin M. G. Zwicker, Serial No. 414,788 filed October 13, 1941.

Any of the ordinary emulsifying agents such as fatty acid soaps including sodium oleate, potassium stearate, sodium myristate, etc., or synthetic saponaceous materials such as hymolal sulfates and are alkyl sulfonates including sodium lauryl sulfate and sodium isopropyl naphthalene sulfonate or mixtures of emulsifying agents may be employed during the polymerization.

The term aryl as herein used designates both unsubstituted and substituted monovalent radicals containing an aromatic carbocyclic ring with the free valence on a nuclear carbon atom, but excludes cyclic groups which are not aromatic in character such as cycloaliphatic groups.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises copolymerizing a butadiene-1,3 hydrocarbon and an aryl olefin in the form of an aqueous emulsion in the presence of a dixanthogen and a diazoamino aryl compound.

2. The method which comprises copolymerizing a butadiene-1,3 hydrocarbon and styrene in the form of an aqueous emulsion in the presence of a dixanthogen and a diazoamino aryl compound.

3. The method which comprises copolymerizing butadiene and styrene in the form of an aqueous emulsion in the presence of a dixanthogen and a diazoamino aryl compound.

4. The method which comprises copolymerizing butadiene and a smaller amount of styrene in the form of an aqueous emulsion in the presence of a dixanthogen and diazoaminobenzene.

5. The method which comprises copolymerizing a butadiene-1,3 hydrocarbon and an aryl olefin in the form of an aqueous emulsion in the presence of a dixanthogen and diazoaminobenzene.

6. The method which comprises copolymerizing a butadiene-1,3 hydrocarbon and an aryl olefin in the form of an aqueous emulsion in the presence of diisopropyl dixanthogen and diazoaminobenzene.

7. The method which comprises copolymerizing a butadiene-1,3 hydrocarbon and styrene in the form of an aqueous emulsion in the presence of diisopropyl dixanthogen and diazoaminobenzene.

8. The method which comprises polymerizing a mixture containing from 85–60 parts by weight of butadiene and from 15–40 parts by weight of styrene in the form of an aqueous emulsion in the presence of a dixanthogen and a diazoamino aryl compound.

9. The method which comprises polymerizing a mixture containing from 85–60 parts by weight of butadiene and from 15–40 parts by weight of styrene in the form of an aqueous emulsion in the presence of a dixanthogen and a diazoamino aryl compound.

10. The method which comprises polymerizing a mixture containing from 85–60 parts by weight of butadiene and from 15–40 parts by weight of styrene in the form of an aqueous emulsion in the presence of a dixanthogen and a diazoamino aryl compound.

11. A composition of matter prepared by the method of claim 1.

12. A composition of matter prepared by the method of claim 2.

13. A composition of matter prepared by the method of claim 3.

14. A composition of matter prepared by the method of claim 4.

15. A composition of matter prepared by the method of claim 5.

16. A composition of matter prepared by the method of claim 6.

17. A composition of matter prepared by the method of claim 7.

18. A composition of matter prepared by the method of claim 8.

19. A composition of matter prepared by the method of claim 9.

20. A composition of matter prepared by the method of claim 10.

CHARLES F. FRYLING.